United States Patent [19]

Morita et al.

[11] Patent Number: 4,827,527
[45] Date of Patent: May 2, 1989

[54] PRE-PROCESSING SYSTEM FOR PRE-PROCESSING AN IMAGE SIGNAL SUCCESSION PRIOR TO IDENTIFICATION

[75] Inventors: Koichiro Morita; Ko Asai, both of Tokyo, Japan

[73] Assignee: NEC Corporation, Tokyo, Japan

[21] Appl. No.: 770,510

[22] Filed: Aug. 29, 1985

[30] Foreign Application Priority Data

| Aug. 30, 1984 | [JP] | Japan | 59-181106 |
| Aug. 30, 1984 | [JP] | Japan | 59-181108 |
| Dec. 26, 1984 | [JP] | Japan | 59-277324 |
| Dec. 26, 1984 | [JP] | Japan | 59-277326 |
| May 8, 1985 | [JP] | Japan | 60-97125 |
| May 8, 1985 | [JP] | Japan | 60-97126 |
| May 8, 1985 | [JP] | Japan | 60-97127 |

[51] Int. Cl.⁴ .................................................. G06K 9/00
[52] U.S. Cl. ........................................ 382/4; 382/45; 382/48
[58] Field of Search ................... 382/4, 5, 44, 45, 46, 382/56, 48; 356/71

[56] References Cited

U.S. PATENT DOCUMENTS

| 3,560,928 | 2/1971 | Berger et al. | 382/4 |
| 3,564,266 | 2/1971 | Klotz, Jr. | 382/4 |
| 3,624,606 | 11/1971 | Lefevre | 382/4 |
| 3,959,884 | 6/1976 | Jordan et al. | 382/4 |
| 4,310,827 | 1/1982 | Asai | 382/5 |

*Primary Examiner*—Leo H. Boudreau
*Assistant Examiner*—Joseph Mancuso
*Attorney, Agent, or Firm*—Foley & Lardner, Schwartz, Jeffery, Schwaab, Mack, Blumenthal & Evans

[57] ABSTRACT

In a pre-processing system (45) for pre-processing a succession of image signals which are extracted from an object on an input surface and which are representative of a ridge pattern of the object, a center position of the ridge pattern is determined with reference to the image signal succession and is compared with a center zone of the input surface so as to decide whether or not the center position is placed at the center zone. The center position can be decided by monitoring occurrence of runs along each scanning line and by detecting a maximum one of the numbers of runs. Alternatively, the center position may be decided by monitoring ridges extended in a preselected direction with respect to the scanning lines and by detecting a maximum one of the numbers of the ridges extended in the preselected direction. The pre-processing system may detect whether the object is true or false by monitoring the image signal succession.

4 Claims, 15 Drawing Sheets

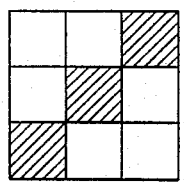
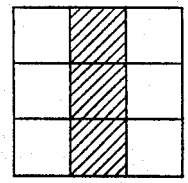
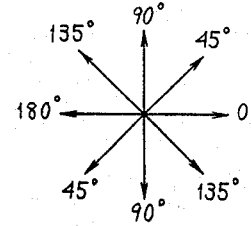
FIG.9(A)   FIG.9(B)   FIG.9(C)
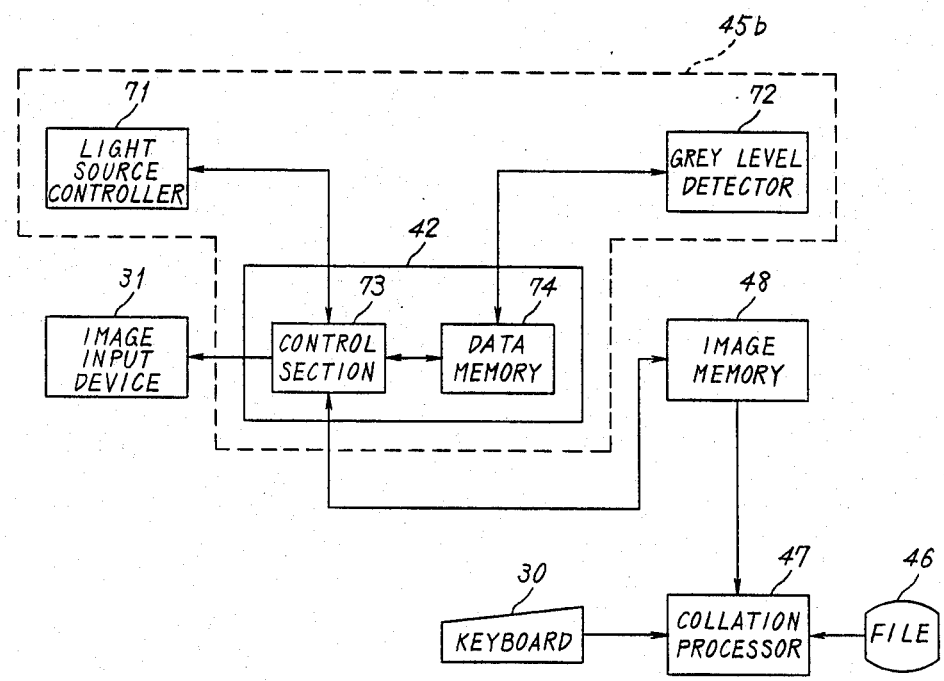
FIG.10

PRE-PROCESSING SYSTEM FOR PRE-PROCESSING AN IMAGE SIGNAL SUCCESSION PRIOR TO IDENTIFICATION

BACKGROUND OF THE INVENTION

This invention relates to a pre-processing system for use in pre-processing a fingerprint prior to identification of the fingerprint.

A fingerprint has uniquenss and unchangeability and therefore serves to identify each person in a criminal investigation. A recent attempt has been directed to application of identification of the fingerprint to a cash dispensing system and/or to a person identifying system of preventing an unauthorized person from entering an offlimits zone.

In such a cash dispensing system or the like, a fingerprint is impressed by a person on an input surface, namely, a finger positioning surface after a preliminary input of an identification code assigned to the person and is collated with a memorized fingerpeint pattern corresponding to the identification code. Thus, both of the fingerprint and the identification code are used in the cash dispensing system or the like to quickly identify each person.

In a copending U.S. patent application Ser. No. 755,810, filed July 17, 1985, by Ko Asai et al, the present applicants, it is pointed out that each fingerprint is preliminarily processed prior to identification of the fingerprint. Such preliminary processing is carried out so as to extract a distinct and clear fingerprint impression and to distinguish between a true fingerprint impression extracted from an actual fingertip of each person and a forged fingerprint impression willfully placed on the input surface.

Any other preliminary processing or pre-processing may preferably be carried out for each fingerprint to accurately identify each person and to reject the forged fingerprint impression. For example, it is preferable that each fingerprint is impressed on a center portion of the input surface. This is because a great deal of image signals can be extracted from the fingerprint and accurately collated with the memorized fingerprint pattern, when the fingerprint is impressed on the center portion.

SUMMARY OF THE INVENTION

It is an object of this invention to provide a pre-processing system which serves to facilitate identification of a fingerprint.

It is another object of this invention to provide a pre-processing system of the type described, which can detect whether or not the fingerprint is impressed in position.

It is a further object of this invention to provide a pre-processing system of the type described, which is capable of distinguishing between a true fingerprint impression and a forged fingerprint impression in new manners.

A pre-processing system to which this invention is applicable is for use in pre-processing a succession of image signals representative of a ridge pattern prior to identification of the ridge pattern. The ridge pattern is derived from an object placed on an input surface. The ridge pattern has a center pattern while the input surface has a center zone. According to this invention, the pre-processing system comprises position deciding means responsive to the image signal succession for deciding a position of the center pattern with reference to the image signal succession to produce a position signal indicative of the position and pattern detecting means responsive to the position signal for detecting whether or not the center pattern is placed at the center zone of the input surface to produce a detection signal representative of whether or not the identification is to be carried out.

BRIEF DESCRIPTION OF THE DRAWING

FIG. 9 is a view for use in describing a detection mask used in the pre-processing system illustrated in FIG. 6;

FIG. 10 is a block diagram of an identification system comprising a pre-processing system according to a third embodiment of this invention;

DESCRIPTION OF THE PREFERRED EMBODIMENTS

Figure 1:
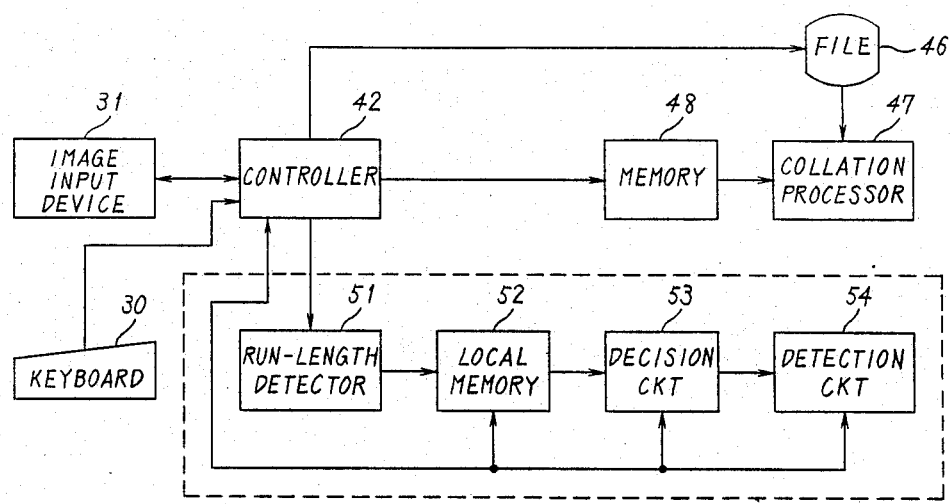
FIG. 1 is a block diagram of an identification system comprising a pre-processing system according to a first embodiment of this invention.
Figure 2:
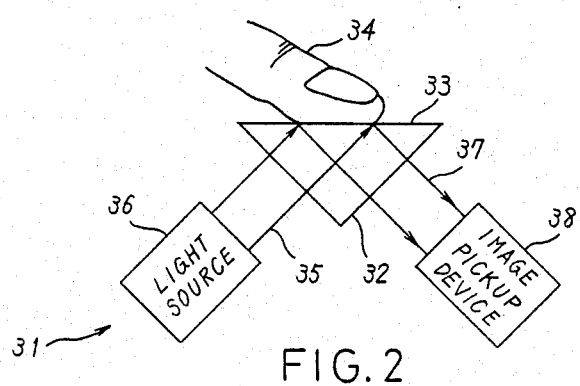
FIG. 2 is a schematic view of an image input device included in the identification system illustrated in FIG. 1.
Figure 3:
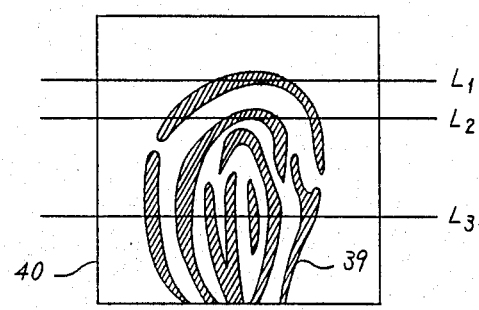
FIG. 3 is a view for use in describing a ridge pattern.

Referring to FIGS. 1 through 3, an identification system is for use in carrying out identification of a fingerprint after a preliminary input of an identification code assigned to each person. A keyboard or push buttons 30 is included in the identification system to input the identification code.

In FIGS. 1 and 2, an image input device 31 comprises a prism 32 of a right-angled isosceles triangle in section. The triangle has equilateral sides directed downwards of FIG. 2 and a hypotenuse directed upwards thereof. An input surface, namely, a finger positioning surface 33 is defined along the hypotenuse while incident and exit surfaces are defined along the equilateral sides, respectively, as will presently be described.

A user brings his fingertip 34 in contact with the input surface 33. The fingertip 34 will be called an object or a true object and has a fingerprint to be identified by the identification system. Incident light 35 is incident from a light source 36 onto the input surface 33 through the incident surface. Reflection takes place on the input surface 33 and reflected light 37 exits through the exit surface to an image pickup device 38, such as an industrial television camera, a CCD, or the like.

When the fingertip 34 is actually brought into contact with the input surface 33, the reflected light 37 is subjected to optical modulation on the input surface 33 by the fingertip 34 to provide an optical image on the image pickup device 38 as schematically illustrated in FIG. 3. In FIG. 3, such an optical image appears as a ridge pattern 39 on an image area 40 of the input surface 33. The ridge pattern 40 is represented by a grey level and has a black level on ridges of the fingerprint and a white level along valleys thereof. This is because each ridge is an aggregation of sweat glands and sweat is laid between the input surface 33 and the ridges to refract the incident light 35. Therefore, the illustrated ridge pattern 39 is representative of a fingerprint impression.

The image pickup device 38 successively scans the image area 40 along scanning lines from the lefthand side of FIG. 3 towards the righthand side at every each horizontal scanning period to produce a succession of image signals. The image signal succession is therefore divisible into a plurality of partial sequences each of which lasts for each horizontal scanning period.

In the interim, it is assumed that the image area 40 is divided along the horizontal lines into a center zone and a pair of peripheral zones laid on both sides of the center zone. In this event, the ridge pattern 39 is also divisible along the scanning lines into a center pattern and a side pattern laid on both sides of the center pattern. Under the circumstances, it is preferable that the center pattern of the ridge pattern 39 is placed in register with or is coincident with the center zone of the image area 40. Otherwise, collation of the ridge pattern 39 might not be done because of lack of information derived from the ridge pattern 39. The center pattern will later be defined more exactly.

The identification system illustrated in FIG. 1 comprises a pre-processing system 45 for detecting the center pattern of the ridge pattern 39 to make the center pattern coincide with the center zone of the image area 40 of the input surface.

Figure 4:
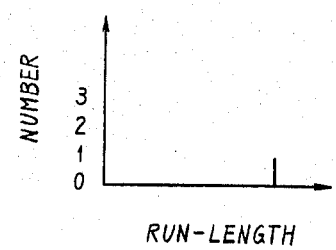
FIG. 4 is a graphical representation for use in describing a distribution of run-lengths derived from the ridge pattern illustrated in FIG. 3.
Figure 4:
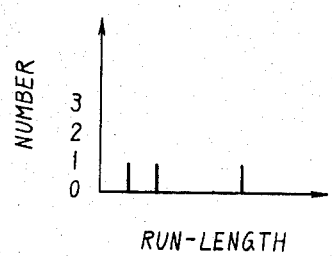
Figure 4:
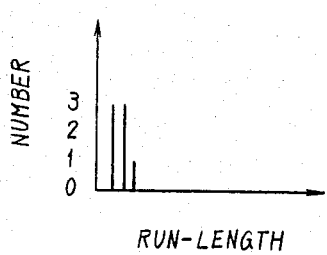

Referring to FIG. 4 together with FIG. 3, let the image area 40 be scanned along the scanning lines exemplified by $L_1$, $L_2$, and $L_3$ in FIG. 3 with the ridge pattern 39 impressed on the image area 40. The exemplified scanning lines $L_1$, $L_2$, and $L_3$ will be called a first, a second, and a third line, respectively. When the ridge pattern 39 is scanned along the first line $L_1$, a single long run of the black level appears. In other words, the ridge pattern 39 has a first partial pattern of a single long run-length along the first line $L_1$. Therefore, the run-lengths and the number thereof have a relationship which can be shown by FIG. 4 (A).

Similarly, when the ridge pattern 39 is scanned along the second line $L_2$, a second partial pattern is extracted from the ridge pattern 39 and specified by three runs which have different run-lengths. Therefore, the second partial pattern is characterized by a relationship illustrated in FIG. 4 (B). When the ridge pattern 39 is scanned along the third line $L_3$, a third partial pattern is extracted from the ridge pattern 39 and specified by seven short runs classified into three-kinds of run-lengths in the manner illustrated in FIG. 4 (C). In FIG. 4 (C), two-kinds of the run-lengths appear three times while the remaining run-length appears once.

In general, it may be said that the numbers of the runs increase as the scanning lines approach a center portion of the ridge pattern 39. In the example being illustrated, a maximum one of the numbers of runs is detected to determine the center pattern of the ridge pattern. Specifically, a position of a scanning line corresponding to the maximum number is determined as a center pattern position for the center pattern. Thus, a feature of the center pattern can be extracted from the ridge pattern. On the other hand, the center zone of the input surface, namely, image area 40 can be determined by selecting a center one of the scanning lines.

In FIG. 1, the identification system comprises a controller 42 operable in a manner to be described and a pre-processing system 45 for detecting the center pattern position from the ridge pattern 39 (FIG. 3) in the above-mentioned manner.

Figure 5:
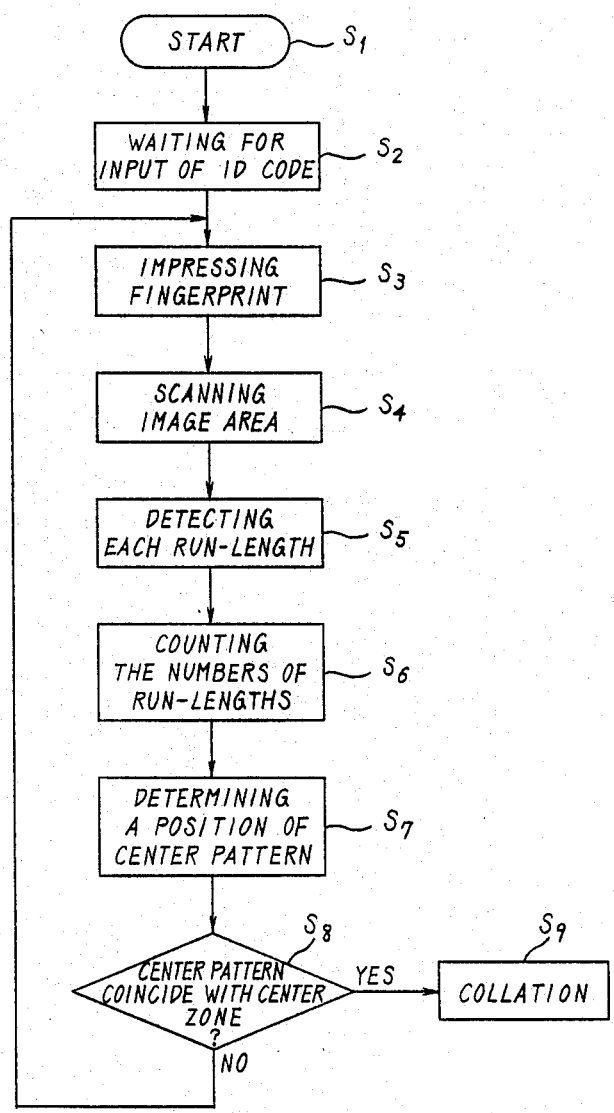
FIG. 5 is a flow chart for use in describing operation of the pre-processing system illustrated in FIG. 1.

Referring to FIG. 5 together with FIG. 1, operation is started in the identification system (FIG. 1) at a first step $S_1$ (FIG. 5) and proceeds to a second step $S_2$ for waiting for an input of an identification (ID) code assigned to each user. When the user manipulates the keyboard 30 to input his identification code, the controller 42 delivers the identification code to a memory file 46 which stores pattern signals specifying features of fingerprints of all users, in addresses corresponding to identification codes. The memory file 46 may be a magnetic disk or the like and reads a specific one of the pattern signals out of one of the addresses corresponding to the delivered identification code.

The specific pattern signal is sent from the memory file 46 to a collation processor 47 to be described later. Concurrently, the controller 42 acoustically or visually informs the user of an impression of his fingerprint in a known manner. When the user impresses his fingerprint on the input surface 33 at a third step $S_3$, the image input device 31 scans the image area 40 (FIG. 3) at a fourth step $S_4$ and produces a succession of image signals in the manner described in conjunction with FIG. 3. The image signal succession is sent through the controller 42 to an image memory 48 to be stored therein and to the pre-processing system 45.

The pre-processing system 45 comprises a run-length detector 51 for detecting each run-length of the runs at a fifth step $S_5$. At a sixth step $S_6$, the run-length detector 51 counts the numbers of runs for each scanning period. A total number of the runs is calculated at every scanning line in the run-length detector 51. A local memory 52 has a plurality of local addresses for the scanning lines, respectively. Each total number is successively stored in each local address of the local memory 52.

A decision circuit 53 successively compares the total numbers read out of the local memory 52 to detect a maximum one of the total numbers. When the maximum number of runs is determined by the decision circuit 53, the scanning line corresponding to the maximum number of runs is determined as a center position of the center pattern of the ridge pattern 39 (FIG. 3) by the decision circuit 53 at a seventh step $S_7$. In this event, the decision circuit 53 produces a scanning line number assigned to the scanning line of the maximum number of runs. The scanning line number is sent to a detection circuit 54 as a position signal representative of the center position of the center pattern. Thus, a combination of the local memory 52 and the decision circuit 53 is operable to monitor a distribution of the runs and to detect the position of the center pattern.

The detection circuit 54 is supplied from a reference number generator (not shown) with a reference number signal indicative of the center zone of the image area 40 (FIG. 3). The reference number signal may be indicative of a scanning line number assigned to a center one of the scanning lines that is placed at a center of the image area 40. The detection circuit 54 compares the position signal with the reference number signal and detects at an eighth step $S_8$ whether or not the center pattern of the ridge pattern 39 coincides with the center zone of the image area 40.

On coincidence between the center pattern and the center zone, the detection circuit 54 supplies the controller 42 with a coincidence signal representative of the coincidence. Responsive to the coincidence signal, the detection circuit 54 accesses the image memory 48 to read the image signal succession out of the image memory 48. At a ninth step $S_9$, the collation controller 54 collates the image signal succession read out of the image memory 48 with the specific pattern signal sent from the memory file 46.

On incoincidence between the center pattern and the center zone, the detection circuit 54 supplies the controller 42 with an incoincidence signal representative of the incoincidence. In this case, the eight step $S_8$ is followed by the third step $S_3$ so as to audibly or visually indicate to impress the fingerprint again. Thereafter, similar operation is repeated until coincidence is detected between the center pattern and the center zone. Practically, the center zone of the image area may be represented by a plurality of the scanning lines, although the center scanning line alone is selected in the above-described manner to specify the center zone.

The coincidence and the incoincidence signals may be called a detection signal representative of whether or not the identification of the fingerprint is to be carried out by collating the image signal succession with the specific pattern signal. Each of the run-length detector 51, the local memory 52, the decision circuit 53, and the detection circuit 54 can be implemented by a known circuit and is therefore not described any longer.

Figure 6:
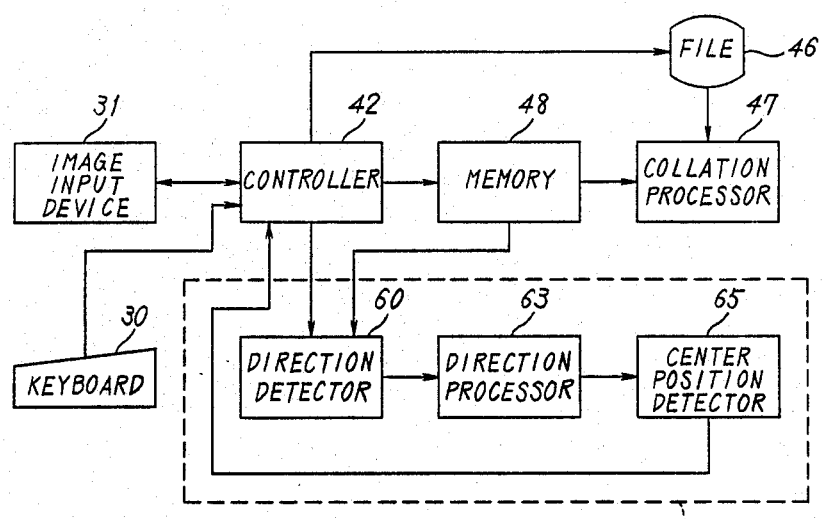
FIG. 6 is a block diagram of an identification system comprising a pre-processing system according to a second embodiment of this invention.
Figure 7:
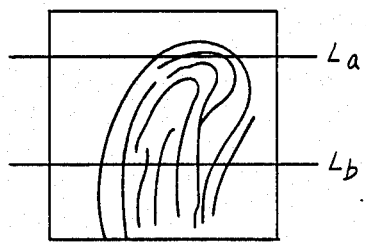
FIG. 7 is a view for use in describing another ridge pattern.
Figures 8A, 8B:
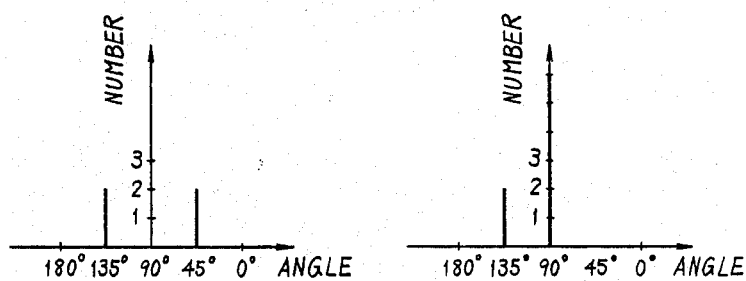
FIG. 8 is a graphical representation for use in describing a distribution of angles derived from the ridge pattern illustrated in FIG. 7.

Referring to FIGS. 6 through 8, an identification system comprises similar parts designated by like reference numerals and a pre-processing system 45a according to a second embodiment of this invention. The pre-processing system 45a is for detecting each angle between each scanning line and each ridge of a ridge pattern exemplified in FIG. 7 to determine a center pattern of the ridge pattern. More specifically, let the ridge pattern illustrated in FIG. 7 be scanned along first and second scanning lines $L_a$ and $L_b$. The first scanning line $L_a$ intersects two ridges of the ridge pattern at four points. The two ridges are substantially parallel to each other and cross the first scanning line $L_a$ at a crossing angle of 135° at two points placed on the lefthand side of FIG. 7 and at a crossing angle of 45° at two points placed on the righthand side thereof. Therefore, the crossing angles along the first scanning line $L_a$ have distribution as illustrated in FIG. 8 (A).

Likewise, the second scanning line $L_b$ intersects eight ridges of the illustrated ridge pattern. Two rightmost ridges of the eight ridges intersect the second scanning line $L_b$ at a crossing angle of 135° while the remaining ridges intersect the second scanning line $L_b$ at a crossing angle of 90°. Therefore, the crossing angles along the second scanning line $L_b$ have a distribution as shown in FIG. 8 (B).

It has been found out that the crossing angles frequently becomes a right angle as the scanning lines approach a center portion of the ridge pattern. In other words, it is possible to detect a position of the center pattern of the ridge pattern by monitoring the crossing angles between each scanning line and the ridge pattern.

Referring to FIG. 9 afresh and FIG. 6 again, the pre-processing system 45a (FIG. 6) comprises a direction detector 60 operable in cooperation with the image memory 48 which is loaded with the image signal succession from the image input device 31 through the controller 42. More specifically, the direction detector 60 serves to detect the crossing angles between each scanning line and the ridges by determining a direction of each ridge.

In FIG. 9, the direction detector 60 successively monitors an element group of three-by-three elements stored in the image memory 48, as illustrated in FIGS. 9 (A) and (B). Such monitoring is possible by successively accessing nine of the addresses for the element group in a known manner. For convenience of description, the element group of the three-by-three elements will be called a detection mask having nine windows which correspond to the respective elements and which are divided into three rows and three columns. The three rows will be called upper, intermediate, and lower rows, respectively, while the three columns will be called left, center and right columns, respectively. In FIG. 9 (A), let the scanning line be placed along the intermediate row and a center one of the windows be indicated along the intermediate row. As shown in FIG. 9 (A), black levels appear in the center window, a left lower one of the windows, and a right upper one thereof. In this event, the ridge in question is inclined at an angle of 45° with the scanning line, as readily understood from FIG. 9 (C). Therefore, the direction detector 60 detects that the crossing angle at the center window becomes equal to 45°. In FIG. 9 (B), the black levels appear in three windows of the center column. In this case, the ridge under consideration is perpendicular to the scanning line extending along the intermediate row, as readily understood from FIG. 9 (B).

At any rate, the direction detector 60 successively produces an angle signal representative of the crossing angle calculated in relation to each window. Responsive to a succession of the angle signals, a direction processor 63 processes the angle signal succession to monitor the angles and the numbers of the right angles. Subsequently, the direction processor 63 determines a maximum number of the right angles together with a position of the scanning line which corresponds to the maximum number of the right angles and which is detected as a center position of the ridge pattern, namely, a position of the center pattern. The center position of the ridge pattern is produced as a position signal.

The position signal is sent to a center position detector 65 which may be identical with the detection circuit 54 illustrated in conjunction with FIG. 1. The center position detector 65 compares the position signal with the center zone of the image area to produce, as the detection signal, either the coincidence signal or the noncoincidence signal in the manner described in conjunction with the detection circuit 54 illustrated in FIG. 1. Thereafter, operation is carried out in a manner similar to FIG. 1.

In order to detect the angles of the ridges with a high precision, a detection mask of, for example, five-by-five windows may be substituted for the detection mask of the three-by-three mask.

Referring to FIG. 10, an identification system comprises similar parts designated by like reference numerals and a pre-processing system 45b according to a third embodiment of this invention. The illustrated pre-processing system 45b comprises a light source controller 71 and a grey level detector 72. In addition, the controller 42 serves as a part of the pre-processing system 45b. It is to be noted here that the identification code (ID) is directly delivered from the keyboard 30 to the collation controller 47. As a result, the collation processor 47 is directly driven by the keyboard 30 to access the memory file 46 and to extract a pattern signal corresponding to the identification code from the memory file 46.

The pre-processing system 45b illustrated in FIG. 10 is operable to avoid an impression of a forged fingerprint. As known in the art, such a forged fingerprint can be skilfully formed by reproducing or printing a fingerprint on a medium, such as a plastic film, a rubber sheet, or the like. The reproduced medium may be called a false medium or a false object. When the false medium is closely brought into contact with the input surface 33 (FIG. 2) with liquid, such as water, interposed between the false medium and the input surface 33, the forged fingerprint may unfavorably be identified as a correct fingerprint. Such unfavorable identification should be avoided in the identification system.

The forged fingerprint may be illuminated by an external optical system (not shown), such as an external source, an external optical system. In this connection, the light source 36 shown in FIG. 2 may be called an internal light source. In FIG. 10, the internal light source 36 is repeatedly and intermittently lit and darkened with a preselected period so as to make it difficult to input the forged fingerprint.

Figure 11:
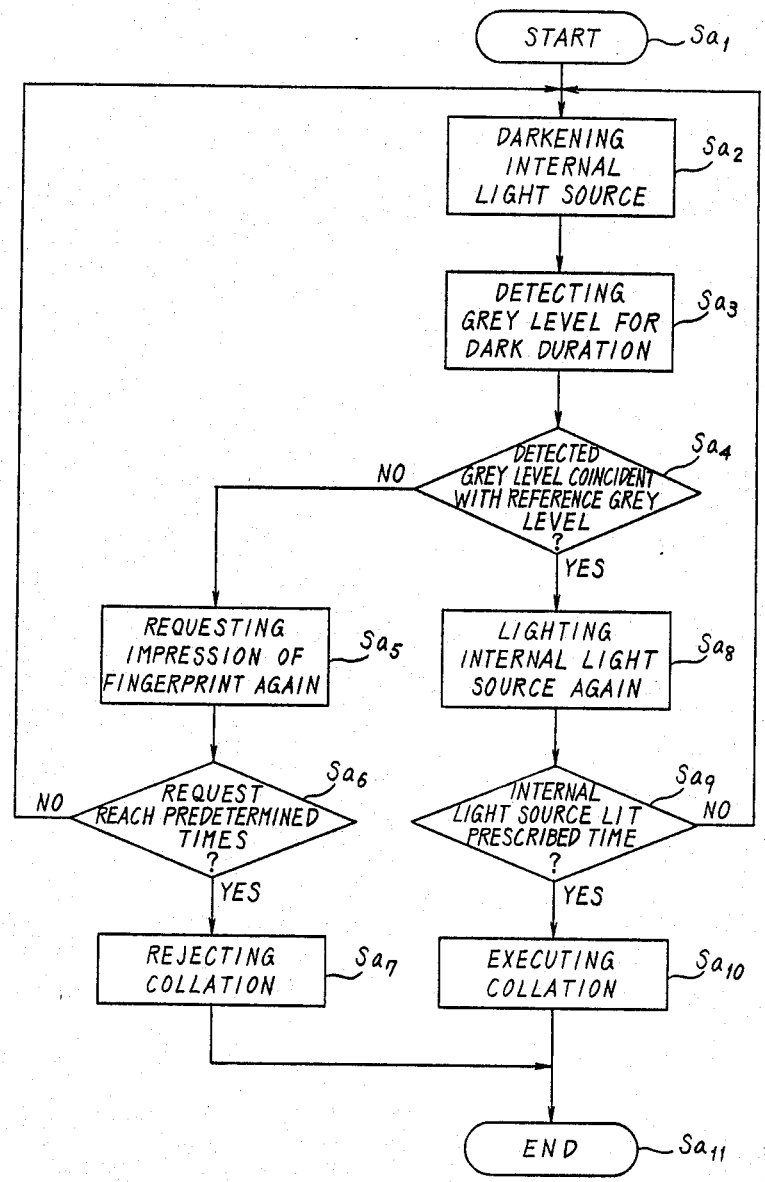
FIG. 11 is a flow chart for use in mainly describing operation of the pre-processing system illustrated in FIG. 10.

Referring to FIG. 11 together with FIG. 10, operation is started at a first step $Sa_1$. The control section 71 at first supplies the light source controller 71 with a sequence of clock pulses having the preselected period. Supply of the clock pulse sequence is readily possible by the use of a usual pulse generator. The light source controller 71 lights the internal light source 36 during presence of each control pulse and darkens the internal light source 36 during absence thereof.

While the internal light source is darkened, the image signal succession is delivered at a second step $Sa_2$ in FIG. 11 from the image input device 31 through the controller 42 to the grey level detector 72. At a third step $Sa_3$, the grey level detector 72 detects each grey level of the image signals for a dark duration of the internal light source 36. The grey level may be classified, for example, into 128, 256, or so. A detected grey level is sent back to the controller 42.

The illustrated controller 42 comprises a control section 73 and a data memory 74 for storing a reference grey level for the dark duration. At a fourth step $Sa_4$, the control section 73 detects whether or not the detected grey level is coincident with the reference grey level.

Incoincidence between the detected and the reference grey levels indicates that the detected grey level may be lighter or brighter than the reference grey level and that the external light source may be used in place of the internal light source 36. In this event, the fourth step $Sa_4$ is followed by a fifth step $Sa_5$ at which an impression of the fingerprint is audibly or visually requested again under control of the control section 73 in the known manner. At a sixth step $Sa_6$, the control section 73 judges whether or not the request for the impression reaches a predetermined number of times.

When the request for the impression does not reach the predetermined times, the sixth step $Sa_6$ is returned back to the second step $Sa_2$. Otherwise, the sixth step $Sa_6$ is followed by a seventh step $Sa_7$ at which collation is rejected between the image signal succession and the pattern signal. Thus, operation is completed.

On the other hand, when the detected grey level is coincident with the reference grey level, the fourth step $Sa_4$ is succeeded by an eighth step $Sa_8$ at which the internal light source 36 is lit again. At a ninth step $Sa_9$, the control section 73 judges whether or not the internal light source 36 is lit a prescribed number of times. When the internal light source 36 is lit the prescribed number of times at the ninth step $Sa_9$, the control section 73 makes the collation processor 47 collate the image signal succession with the pattern signal read out of the memory file 46 at a tenth step $Sa_{10}$.

On collation of the image signal succession with the pattern signal, the image signal succession may be produced at the tenth step $Sa_{10}$ by the image input device 31 with the internal light source 31 being lit and may thereafter be delivered from the control section 73 to the image memory 48. Alternatively, the image signal succession may previously be sent from the image input device 31 to the image memory 48 prior to the tenth step $Sa_{10}$. Thus, operation is completed at an eleventh step $Sa_{11}$.

Figure 12:
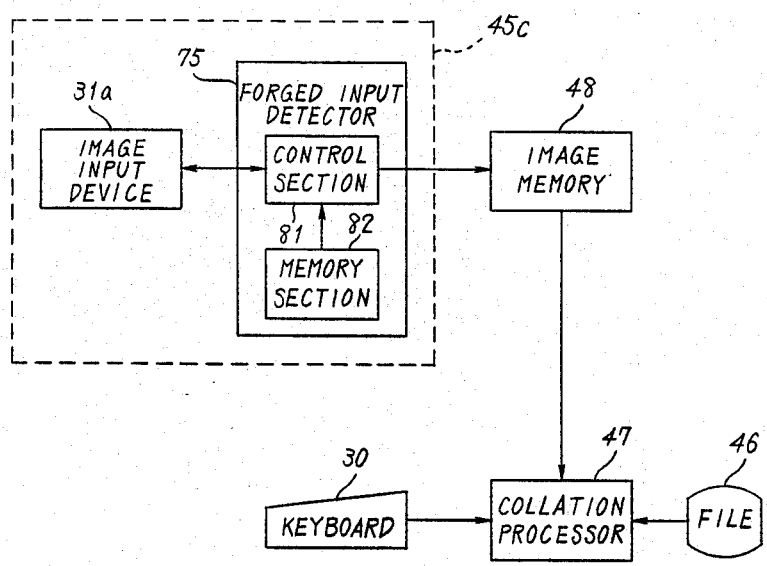
FIG. 12 is a block diagram of an identification system comprising a pre-processing system according to a fourth embodiment of this invention.
Figure 13:
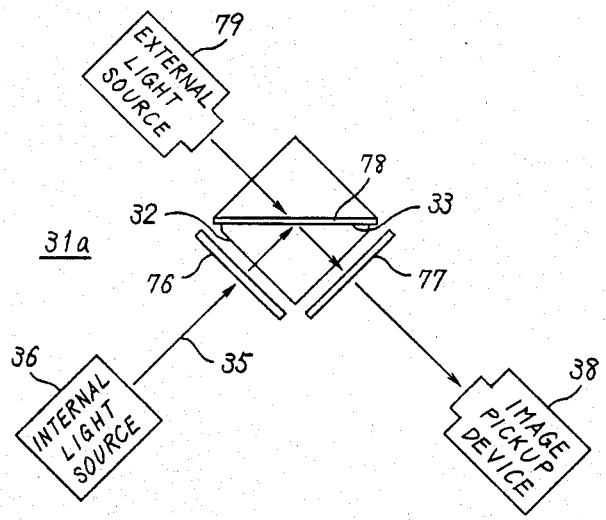
FIG. 13 is a schematic view of an image input device used in the pre-processing system illustrated in FIG. 12.

Referring to FIGS. 12 and 13, an identification system comprises similar parts designated by like reference numerals and a pre-processing system 45c according to a fourth embodiment of this invention. The pre-processing system comprises an image input device 31a illustrated in FIG. 13 and a forged input detector 75, as shown in FIG. 12.

In FIG. 13, the illustrated image input device 31s is similar to that illustrated in FIG. 2 except that first and second optical band-pass filters 76 and 77 are placed along the incident and the exit surfaces of the prism 32, respectively. In the example being illustrated, the first and the second optical band-pass filters 76 and 77 entirely cover the incident and the exit surfaces with gaps left therebetween, respectively. The first optical band-pass filter 76 has a passband partially superposed on that of the second optical band-pass filter 77. For example, the passband of the first optical band-pass filter 76 may be wider than that of the second optical band-pass filter 77.

In this structure, the incident light 35 from the internal light source 36 is incident onto the input surface 33 through the first optical band-pass filter 36 and reflected on the input surface 33 to be sent through the second optical band-pass filter 77 to the image pickup device 38.

When a fingertip is actually brought into contact with the input surface 33 as a true object in the manner illustrated in FIG. 2, the image pickup device 38 picks up a ridge pattern, as mentioned in conjunction with FIG. 3. The ridge pattern is surrounded by a true background image as illustrated in FIG. 3. Herein, a grey level of the true background image is determined by the passbands of the first and the second optical band-pass filters 76 and 77.

Herein, attention will be directed to a forged fingerprint printed on a transparent film 78. It is assumed that the transparent film 78 is brought into close contact with the input surface 33 with liquid laid between the input surface 33 and the transparent film 78 and is illuminated through an external prism (unnumbered) by an external light source 79 which emits external light falling within the same band as the incident light 35 emitted from the internal light source 36.

Under the circumstances, the external light reaches the image pickup device 38 through the second optical band-pass filter 77 alone to provide a false fingerprint image and a false background image. Such a false background image has a grey level different from that of the true background image because the external light passes through the second optical band-pass filter 77 alone.

The forged input detector 75 is for discriminating between the true and the false background images by detecting a difference of grey levels between the true and the false background images.

Figure 14:
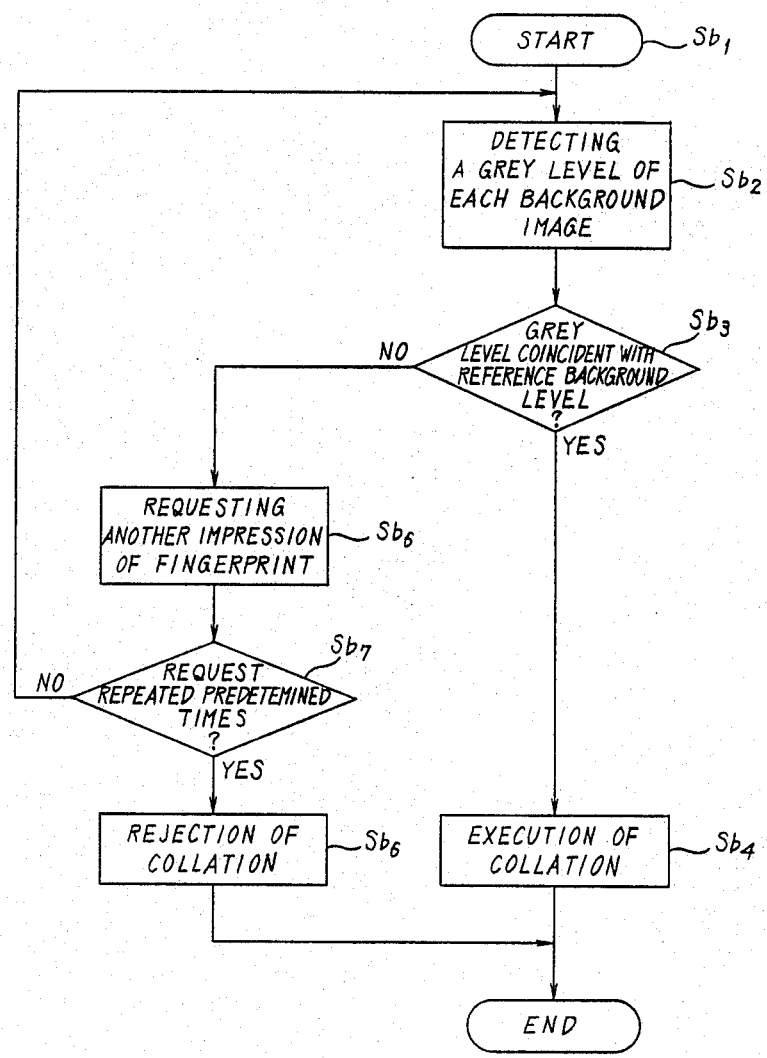
FIG. 14 is a flow chart for use in describing operation of the pre-processing system illustrated in FIG. 12.

Referring to FIG. 14 together with FIG. 12, the forged input detector 75 comprises a control section 81 operable in a manner to be presently described and a memory section 82 which stores a reference background level corresponding to the grey level of the true background image.

When operation is started at a first step $Sb_1$, the image signal succession is sent from the image input device 31a through the control section 81 to the image memory 48. The control section 81 derives from the image memory 48 preselected ones of the image signals that are placed at a background portion of an image area and which will be called background images. At a second step $Sb_2$, the control section 81 detects a grey level of each background image. Subsequently, the control section 81 reads the reference background level out of the memory section 82 and judges at a third step $Sb_3$ whether or not the grey level of each background image is coincident with the reference background level.

If the grey level of each background image is coincident with the reference background level, the control section 81 makes the collation processor 47 collate the image signal succession with the pattern signal at a fourth step $Sb_4$ in a manner similar to that mentioned in conjunction with FIG. 10.

Otherwise, the third step $Sb_3$ is followed by a fifth step $Sb_5$ at which another impression of the fingerprint is audibly or visually requested. At a sixth step $Sb_6$, the control section 81 judges whether or not the request for the impression is repeated a predetermined number of times.

If iteration of the request reaches the predetermined times, the sixth step $Sb_6$ is succeeded by a seventh step $Sb_7$ for rejecting collation between the image signal succession and the pattern signal. Otherwise, the sixth step $Sb_6$ is succeeded by the second step $Sb_2$ so as to repeat the above-mentioned operation.

Thus, it is possible to discriminate between the true and the false objects by monitoring the grey level of the background image of the image signal succession.

In FIG. 13, the first and the second optical band-pass filters 76 and 77 may consist of thin films and may be coated on the incident and the exit surfaces, without any gaps left therebetween. In addition, each of the first and the second optical band-pass filters 76 and 77 may partially be coated on each surface of the prism 32. In this event, a part of the incident light 35 passes through the first and the second optical band-pass filters 76 and 77 while the remaining incident light does not pass therethrough. The forged input detector 75 can discriminate between the true and the false objects by monitoring a ratio between the part and the remaining part of the incident light.

It is preferable that each of the first and the second optical band-pass filters 76 and 77 is interchangeable in case that each filter is stolen.

Figure 15:
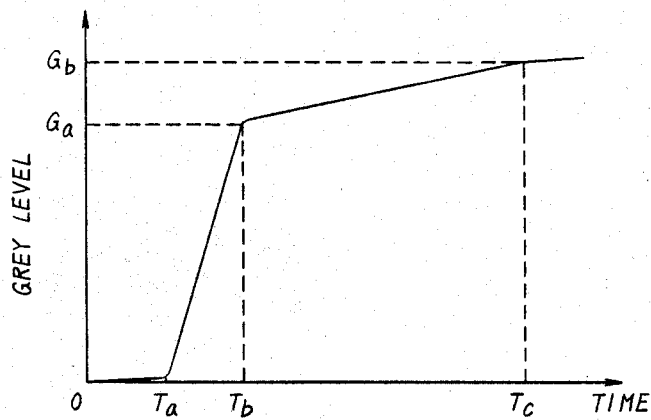
FIG. 15 is a graph for use in describing a relationship between a grey level and time.

Referring to FIG. 15, a grey level of a fingerprint impression, namely, a ridge pattern is varied with time when a fingertip is placed as a true object on an input surface in a manner as illlustrated in FIG. 2. More specifically, when the fingertip is brought into contact with the input surface at a time instant $T_a$, the grey level of the ridge pattern is rapidly varied and reaches a first predetermined grey level $G_a$ at a time instant $T_b$. Thereafter, the grey level is slowly changed from the first predetermined grey level $G_a$ and reaches a second predetermined grey level $G_b$ at a time instant $T_c$. Such a variation of the ridge pattern results from sweat oozing through sweat glands. A time interval between the time instants $T_a$ and $T_b$ will be referred to as a first interval.

On the other hand, when the forged fingerprint is placed as a false object on the input surface in the manner illustrated in FIG. 13, the grey level is never changed with time because of absence of sweat.

Under the circumstances, it is possible to discriminate between the true and the false objects by monitoring the grey level for the first time interval between the time instant $T_a$ and the time instant $T_b$. Moreover, it is possible to accurately identify the fingerprint, if the true object is scanned for a time interval between the time instant $T_b$ and the time instant $T_c$ to produce the image signal succession. The time instant between the time instants $T_b$ and $T_c$ will be referred to as a second interval.

Figure 16:
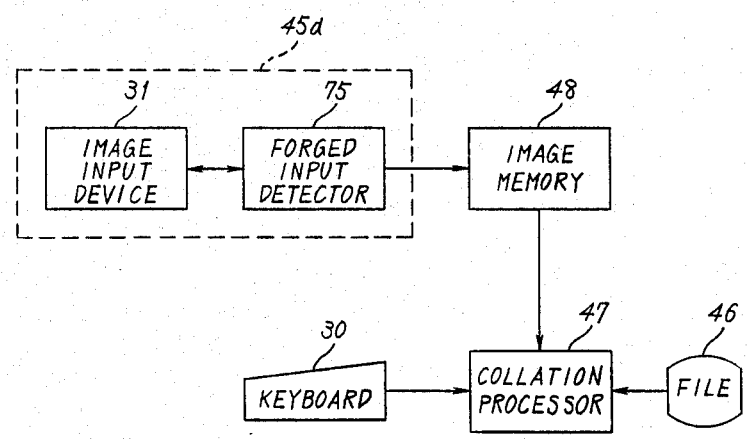
FIG. 16 is a block diagram of an identification system comprising a pre-processing system according to a fifth embodiment of this invention.
Figure 17:
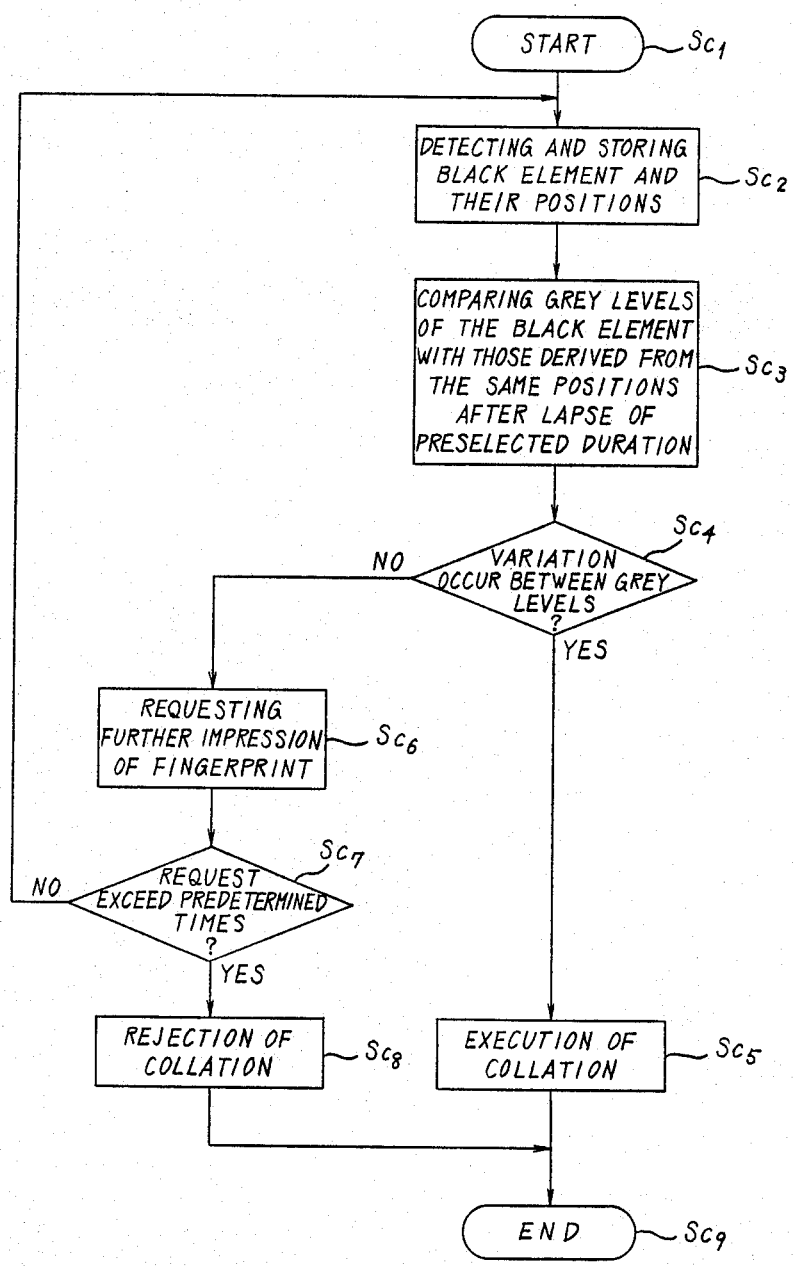
FIG. 17 is a flow chart for use in describing operation of the pre-processing system illustrated in FIG. 16.

Referring to FIGS. 16 and 17 together with FIG. 12, a pre-processing system 45d according to a fifth embodiment of this invention comprises an image input device 31 similar to that illustrated in FIG. 2 and a forged input detector 75 similar to that illustrated in FIG. 12. When an object is placed on the input surface of the image input device 31 at a first step $Sc_1$, operation is started. At a second step $Sc_2$, the image input device 31 produces the image signal succession in the form of a digital signal succession which may be called a preceding digital signal succession. Specifically, the grey level of each image signal is converted, for example, into 256 levels. Responsive to the preceding digital signal succession, the forged input detector 75 compares each preceding digital signal with a predetermined threshold signal corresponding to the first predetermined grey level $G_a$. As a result, only black elements are selected from the preceding digital signal succession and represented by the grey levels. The grey levels of the black elements and their positions are stored in the image memory 48.

After lapse of a preselected duration shorter than the first interval between the time instants $T_a$ and $T_b$ (FIG. 15), the image signal succession is again extracted as a succeeding digital signal succession from the object at a third step $Sc_3$. The forged input detector 75 selects the succeeding digital signals with reference to the positions of the black elements selected from the preceding digital signals. The grey levels of digital signals derived from the same positions are compared by the forged input detector 75 with the grey levels of the black elements derived from the preceding digital signals.

At a fourth step $Sc_4$, the forged input detector 75 detects whether or not a variation of the grey levels occurs between the preceding and the succeeding digital signals. On occurrence of the variation, the forged input detector 75 judges that the object is true. As a result, the fourth step $Sc_4$ is followed by a fifth step $Sc_5$ at which a further image signal succession is derived from the object within the second interval between the time instants $T_b$ and $T_c$ (FIG. 15) and is collated with the corresponding pattern signal read out of the memory file 46.

When the variation of the grey levels does not occur between the preceding and the succeeding digital signals, the fourth step $Sc_4$ is succeeded by a sixth step $Sc_6$ at which a further impression of the fingerprint in question is requested again. At a seventh step $Sc_7$, the forged input detector 75 judges whether or not the request for the impression is repeated a predetermined number of times. If repetition of the request does not exceed the predetermined times, operation is returned back to the second step $Sc_2$. Otherwise, the forged input detector 75 rejects collation of the fingerprint in question at an eighth step $Sc_8$. Thus, the forged input detector 75 judges that the object is false.

After either the fifth step $Sc_5$ or the eighth step $Sc_8$, operation is completed at a ninth step $Sc_9$.

Figure 18:
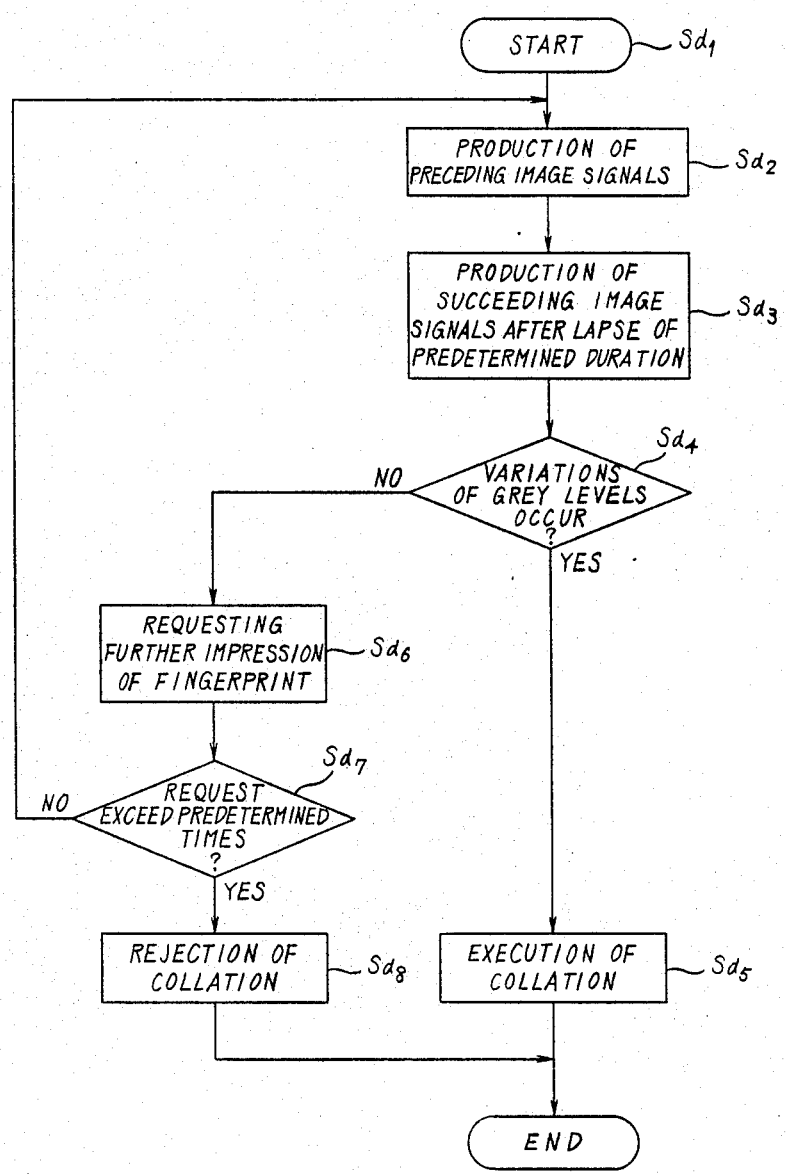
FIG. 18 is a flow chart for use in describing another operation of the pre-processing system illustrated in FIG. 16.

Referring to FIG. 16 again and FIG. 18 afresh, the pre-processing system 45d illustrated in FIG. 16 may be operated in a manner to be presently described. In this event, the ridge pattern is subtly moved with time when the true object, namely, fingertip is actually placed on the input surface. This means that positions of black levels are slightly changed on an image area as shown in FIG. 3 with time. Under the circumstances, it is possible to discriminate between the true and the false objects by monitoring variations of the grey levels at fixed positions determined on the image area. In the example being illustrated, the fixed positions are of all of picture elements arranged on the image area.

More specifically, when operation is started at a first step $Sd_1$, the image signal succession is produced from the image input device 31 in the form of a succession of digital signals at a second step $Sd_2$. The image signal succession is supplied as a succession of preceding image signals through the forged input detector 75 to the image memory 48. At a third step $Sd_3$, a succession of succeeding image signals is sent from the image input device 31 to the forged input device 75 after lapse of a predetermined duration. The succeeding image signal succession may also be stored in the image memory 48.

The forged input device 75 successively compares the succeeding image signals with the corresponding preceding image signals read out of the image memomry 48. At a fourth step $Sd_4$, the forged input device 75 judges whether or not variations of the grey levels occur between the preceding and the succeeding image signals.

When the variations of the grey levels are detected by the forged input detector 75, the fourth step $Sd_4$ is followed by a fifth step $Sd_5$ at which collation is carried out in the manner described in conjunction with FIG. 17.

When variations of the grey levels are not detected at the fourth step $Sd_4$, sixth, seventh, and eighth steps $Sd_6$, $Sd_7$, and $Sd_8$ are successively carried out in the manner described in conjunction with the sixth, the seventh, and the eighth steps $Sc_6$, $Sc_7$, and $Sc_8$ of FIG. 17.

Figure 19:
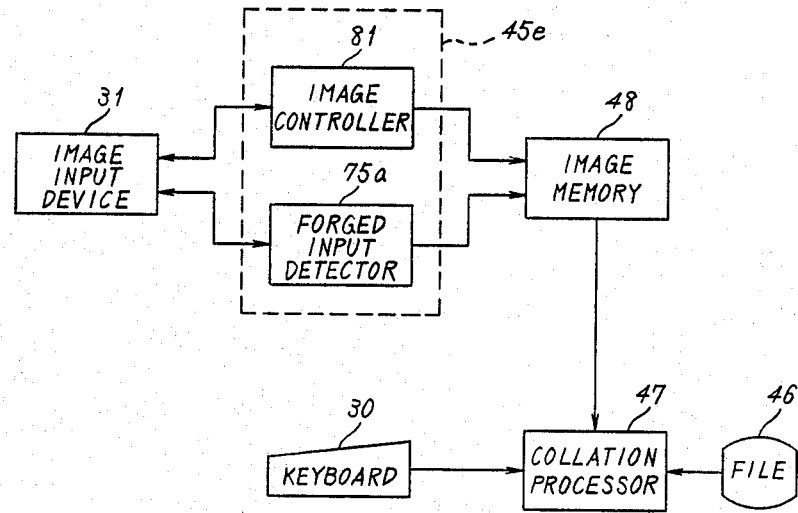
FIG. 19 is a block diagram of an identification system comprising a pre-processing system according to a sixth embodiment of this invention.
Figure 20:
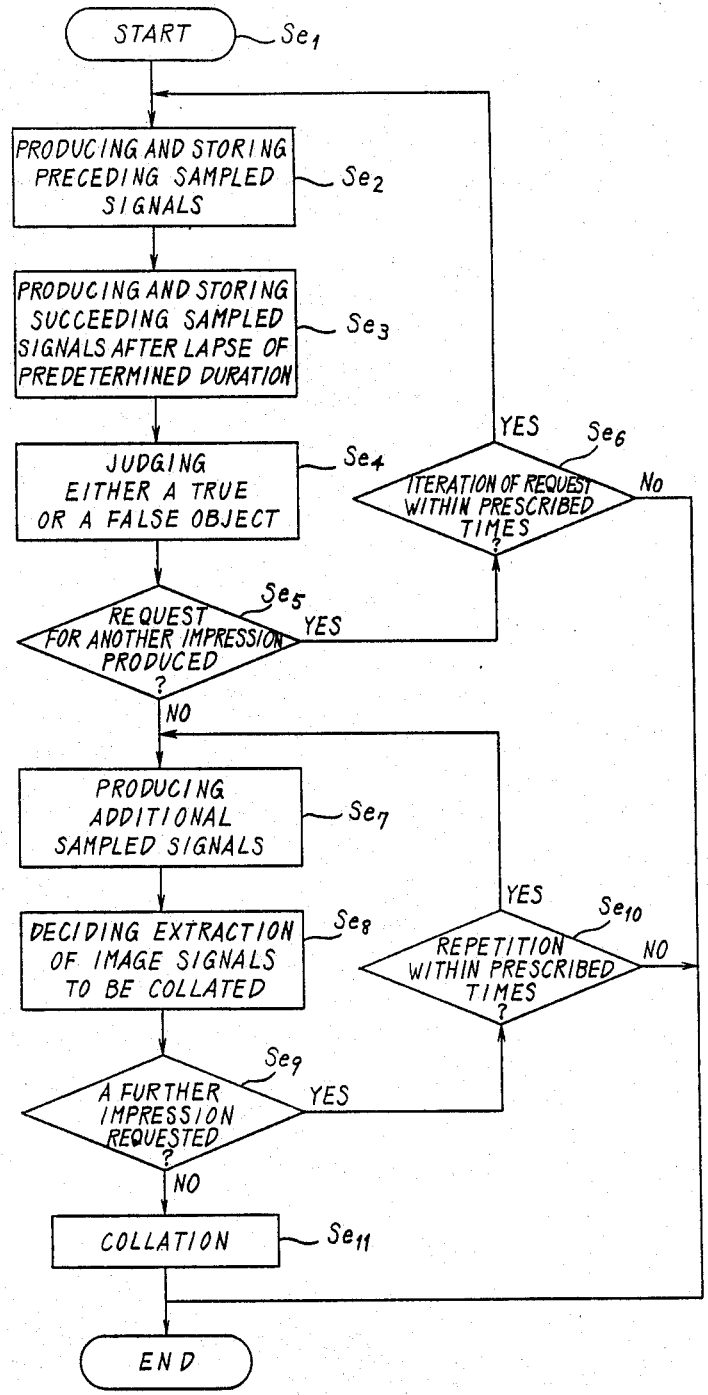
FIG. 20 is a flow chart for use in describing operation of the pre-processing system illustrated in FIG. 19.
Figures 21, 22:
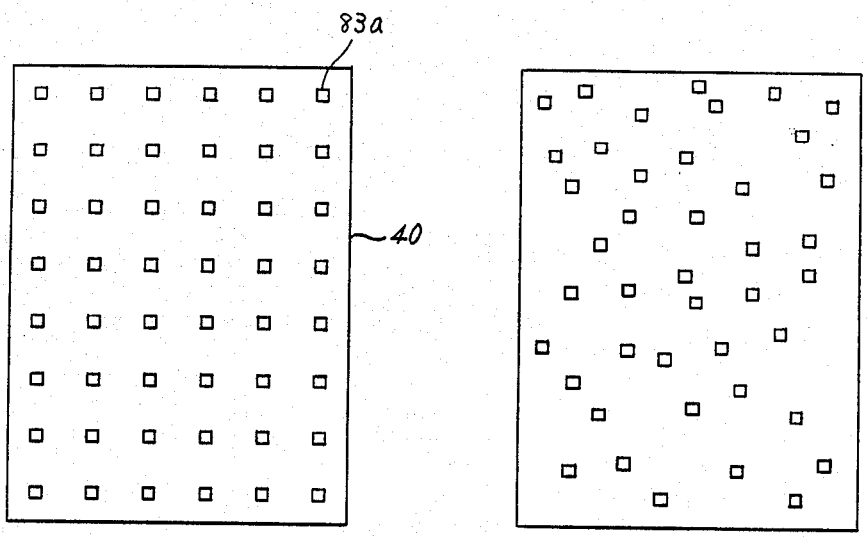
FIG. 21 is a view for use in describing an arrangement of sampling positions at which the pre-processing syatem illustrated in FIG. 19 carries out sampling operation.
FIG. 22 is a similar view for use in describing another arrangement of sampling positions.

Referring to FIGS. 19 through 21, an identification system comprises similar parts designated by like reference numerals and a pre-processing system 45e according to a sixth embodiment of this invention. The illustrated pre-processing system is operable to quickly detect whether an object is true or false and to extract a distinct fingerprint impression from the object.

The grey levels of the fingerprint are variable with time in the manner illustrated in FIG. 15. In this connection, detection of either a true object or a false object may be made within the first interval between the time instants $T_a$ and $T_b$ while extraction of a fingerprint from a true object detected may be made after lapse of the first interval. However, such variations of the grey levels have individual differences in dependency upon an amount of sweat. Accordingly, each user may feel uncomfortable when it takes a long time to indicate a request for another impression as described in conjunction with the sixth steps $Sc_6$ and $Sd_6$ illustrated in FIGS. 17 and 18.

In order to quickly detect either a true or a false object, the pre-processing system 45e illustrated in FIG. 19 comprises a forged input detector 75a for partially processing an optical image on an image area 40 as illustrated in FIG. 3 and an image controller 81 for controlling a timing to extract the distinct fingerprint impression from the object.

More specifically, the illustrated forged input detector 75a samples the image signal succession at sampling instants corresponding to sampling positions 82a illustrated in FIG. 21. The sampling positions 82a are regularly arranged on the image area 40 and are equally spaced from one another. From this fact, it is readily understood that the forged input detector 75a comprises a clock pulse generator (not shown) for producing a sequence of clock pulses and a controller (not shown also) for sampling the image signal succession by the clock pulse sequence.

In FIG. 20, operation is started at a first step $Se_1$ and the image signal succession is successively sent from the image input device 31 to the forged input detector 75a. The image signal succession is sampled in the manner illustrated in FIG. 21 by the forged input detector 75a to be produced as a succession of sampled signals. The sampled signal succession is stored as a succession of preceding signals in the image memory 48 at a second step $Se_2$. After lapse of a predetermined duration, the image area 40 (FIG. 21) is scanned and sampled again in the manner illustrated in FIG. 21. As a result, a succession of succeeding sampled signals is produced by the forged input detector 75a and stored in the image memory 48 at a third step Se$_3$.

At a fourth step Se$_4$, the forged input detector 75a accesses the image memory 48 to compare the succeeding sampled signals with the preceding sampled signals and to judge whether the object is true or false. Responsive to a result of the judgement made at the fourth step Se$_4$, the forged input detector 75a determined at a fifth step Se$_5$ whether a request for another impression is to be produced or not.

When the request for another impression is produced by the forged input detector 75a, the fifth step Se$_5$ is followed by a sixth step Se$_6$ at which the forged input detector 75a judges whether or not an iteration of the request is within a prescribed number of times. If the iteration is within the prescribed times, operation is returned from the sixth step Se$_6$ back to the second step Se$_2$. Otherwise, identification of the object is not carried out any longer.

When the request for another impression is not produced at the fifth step Se$_5$, namely, the object is true, the image area 40 is further scanned under control of the image controller 81 to produce an additional image signal succession at a seventh step Se$_7$. The additional image signal succession is sampled at either the sampling instants as illustrated in FIG. 21 or any other sampling instants. Anyway, the forged input detector 75a supplies a succession of additional sampled signals at the seventh step Se$_7$ to the image memory 48.

The optical image or image area is sampled at a time instant controlled by the image controller 81. The time instant appears after the time instant T$_b$ illustrated in FIG. 15.

At an eighth step Se$_8$, the image controller 81 decides whether or not the image signal succession is to be extracted from the object so as to be collated with the corresponding pattern signal. The decision is made with reference to the first predetermined grey level G$_a$ illustrated in FIG. 15. The eighth step Se$_8$ is succeeded by a ninth step Se$_9$ at which the image controller 81 judges whether or not a further impression of the fingerprint is to be requested. When the request is to be repeated, a repetition of the request is measured by the image controller 81 at a tenth step Se$_{10}$. If the repetition of the request is within the prescribed number of times, the tenth step Se$_{10}$ is succeeded by the seventh step Se$_7$. Otherwise, operation is completed.

If any other impression is not necessary, the ninth step Se$_9$ is followed by an eleventh step Se$_{11}$ at which collation is carried out. In this event, the optical image is further scanned on the image area 40 to produce the image signal succession derived from a whole of the input surface. The image signal succession may directly be sent from the image input device 31 to the image memory 48.

Referring to FIG. 22, another example of a sampling position arrangement has sampling positions irregularly distributed or scattered on the optical image. With this example, the sampling positions can be determined by random numbers to sample or select the picture elements thereat.

It is to be noted here that the fingerprint has a ridge arrangement comprising a lot of curved ridges arranged in order. An irregular distribution of the sampling positions serves to uniformly select the ridges and the remaining portions. Uniform detection of the fingerprint impression is therefore possible all over the optical image.

Figures 23, 24:
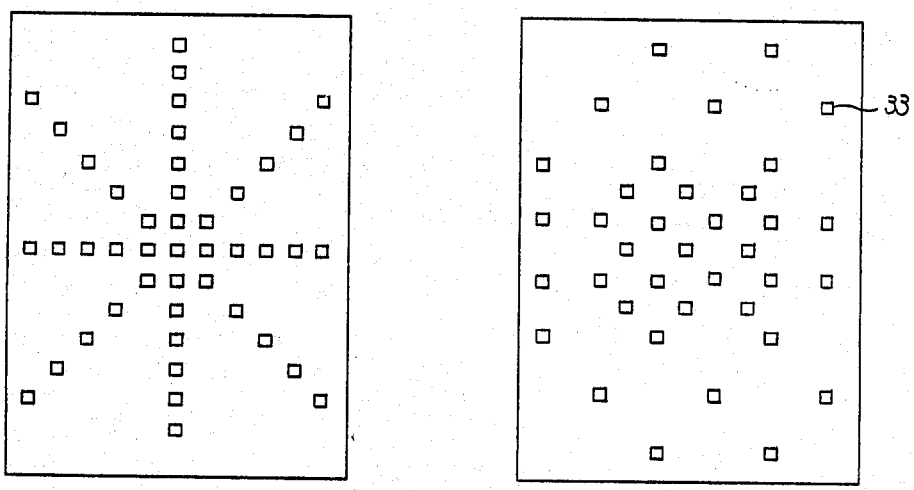
FIG. 23 is a similar view for use in describing another arrangement of sampling positions.
FIG. 24 is a similar view for use in describing still another arrangement of sampling positions.
Figure 25:
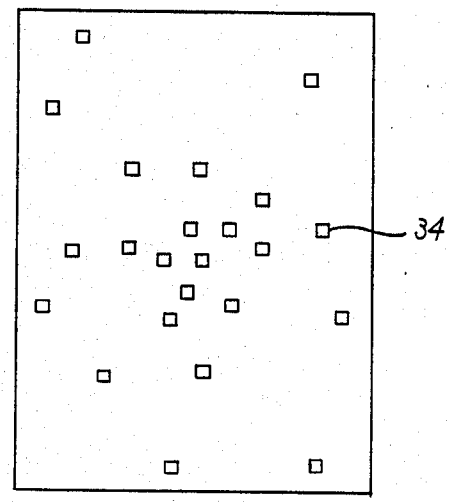
FIG. 25 is a similar view for use in describing yet another arrangement of sampling positions.

Referring to FIGS. 23 through 25, sampling positions are distributed on the optical images, respectively. In FIG. 23, the sampling positions are radially and discretely arranged from a center portion of the optical image to a peripheral portion surrounding the center portion. In FIGS. 24 and 25, the sampling positions are irregularly arranged. In any event, each distribution of the sampling positions is dense or thick at the center portion and is rough or thin at the peripheral portion. Anyway, the sampling positions are bidimensionally distributed on the optical images, namely, the input surface.

While this invention has thus far been described in conjunction with several embodiments thereof, it will readily be possible for those skilled in the art to put this invention into practice in various other manners. For example, it is possible to pre-process an image signal succession derived from an object except the fingertip. In addition, decision of either a true object or a false object may be made after the center pattern of the optical image is detected in the manners illustrated in FIGS. 1 and 6.

What is claimed is:

1. A pre-processing system for use in pre-processing a succession of image signals representative of a ridge pattern prior to identification of said ridge pattern, each of said image signals having a grey level classifiable into either level, said image signal succession being divisible into a plurality of partial sequences appearing within a plurality of predetermined durations, respectively, said ridge pattern being derived from an object placed on an input surface, said ridge pattern having a center pattern while said input surface has a center zone, comprising:

run detecting means responsive to said image singal succession for detecting a succession of runs to successively count numbers of the runs for respective predetermined durations, each of said runs being specified by preselected one of said first and said second levels;

comparing means coupled to said run detecting means for comparing the numbers of runs with one another to detect a maximum one of said numbers;

means for determining a position of said center pattern from said maximum one of the numbers to produce a position signal indicative of said position; and pattern detecting means responsive to said position signal for detecting whether said center pattern is placed at said center zone of the input surface to produce a detection signal representative or whether said identification is to be carried out.

2. A pre-processing system as claimed in Claim 1, wherein said pattern detecting means comprises:

means for indicating a reference position indicative of said center zone; and means for comparing the position of said center position with said reference position to produce said detection signal.

3. A pre-processing system for use in pre-processing a succession of image signals representative of a ridge pattern composed of ridges prior to identification of said ridge pattern, each of said image signals being derived from an object placed on an input surface by successively scanning said ridge pattern in a single scanning direction, said ridge pattern having a center pattern while said input surface has a center zone, said ridge pattern having a plurality of ridges, comprising:

monitoring means responsive to said image signal succession for monitoring a part of said ridge pattern to produce a sequence of ridge signals representative of said part of the ridge pattern;

direction detecting means coupled to said monitoring means for detecting directions of the ridges from said ridge signal sequence;

angle detecting means coupled to said direction detecting means for detecting angles of the ridges relative to said scanning direction from said directions of the ridges;

counting means coupled to said angle detecting means for counting numbers of the ridges which are perpendicular to said scanning direction; and determining means coupled to said counting means for determining a position of said center pattern from said numbers of the ridges perpendicular to said scanning direction to produce a position signal representative of said position of the center pattern.

4. A pre-processing system as claimed in claim 3, wherein said position of the center pattern is determined by a maximum one of the numbers of the ridges perpendicular to said scanning direction.

* * * * *